United States Patent [19]

Foch et al.

[11] Patent Number: 4,550,365
[45] Date of Patent: Oct. 29, 1985

[54] STATIC SEMI-CONDUCTOR ELECTRICAL ENERGY CONVERTER APPARATUS

[75] Inventors: Henri Foch; Jacques Roux, both of Toulouse, France

[73] Assignee: Agence Nationale pour la Valorisation et la Recherche, Paris, France

[21] Appl. No.: 523,192

[22] Filed: Aug. 15, 1983

[30] Foreign Application Priority Data

Aug. 13, 1982 [FR] France ................ 82 14192

[51] Int. Cl.⁴ .......................................... H02P 13/18
[52] U.S. Cl. ..................................... 363/98; 363/132; 363/138
[58] Field of Search ....................... 363/64, 71, 97, 98, 363/131, 132, 135, 136, 137, 138

[56] References Cited

U.S. PATENT DOCUMENTS

| 3,483,462 | 12/1969 | Bedford | 363/137 |
| 3,875,496 | 4/1975 | Carsten | 363/97 |
| 4,203,151 | 5/1980 | Baker | 363/43 |
| 4,330,819 | 5/1982 | Foch et al. | 363/132 |
| 4,488,211 | 12/1984 | Miyairi | 363/64 |

FOREIGN PATENT DOCUMENTS 2421125 11/1975 Fed. Rep. of Germany .
2071434 2/1980 United Kingdom .

Primary Examiner—Peter S. Wong
Assistant Examiner—Anita M. Ault
Attorney, Agent, or Firm—Sandler & Greenblum

[57] ABSTRACT

A static energy converter apparatus, having at least one converter Γ conforming to that described in U.S. Pat. No. 4,330,819, includes a supplementary output stage 21 adapted to produce an alternating current that changes direction upon each commutation of the controlled blocking static interrupters of the converter Γ. Stage 21 is such that the direction of the alternating current corresponds to the direction of circulation of current in the collector-emitter of each interrupter at the instant of commutation.

9 Claims, 15 Drawing Figures

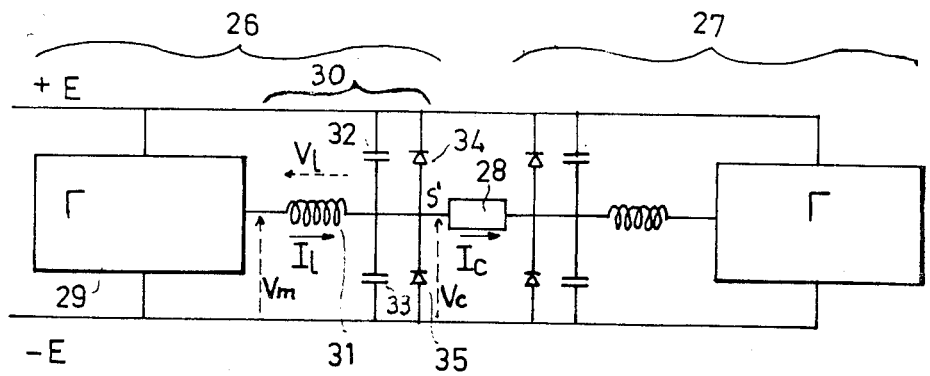
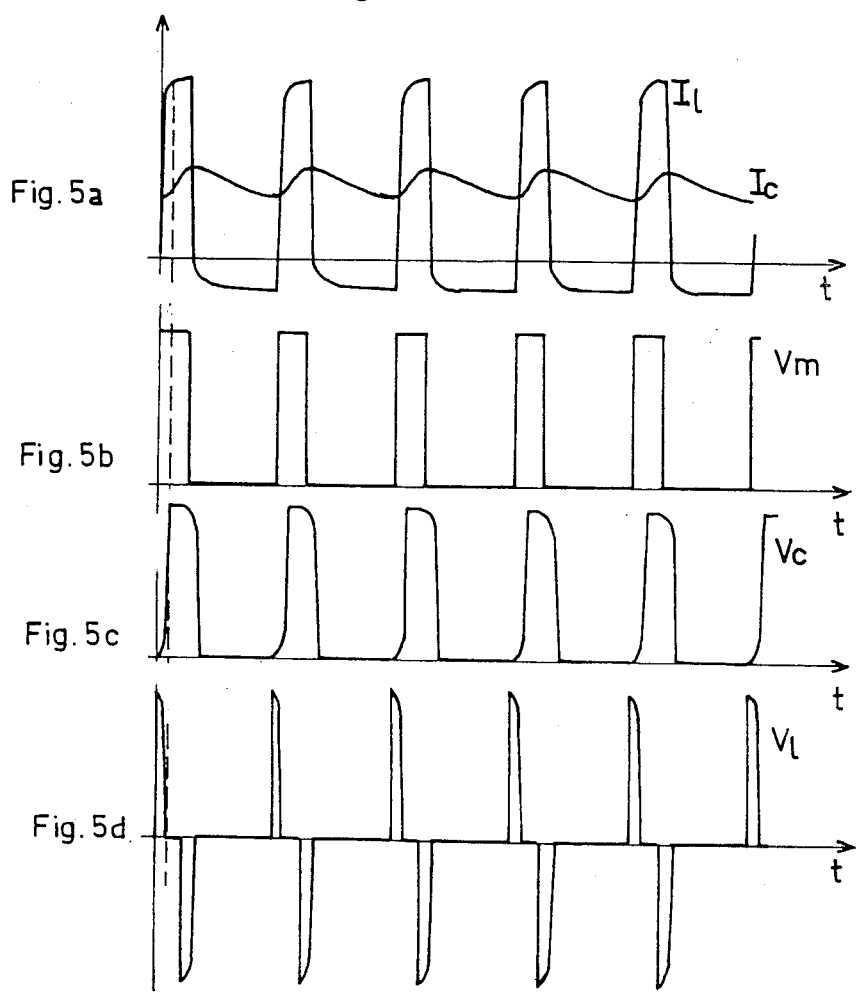
Fig. 4
Fig. 5a
Fig. 5b
Fig. 5c
Fig. 5d

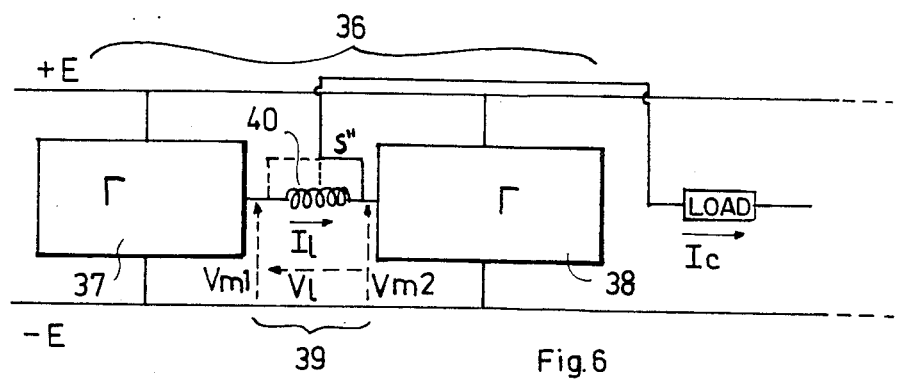
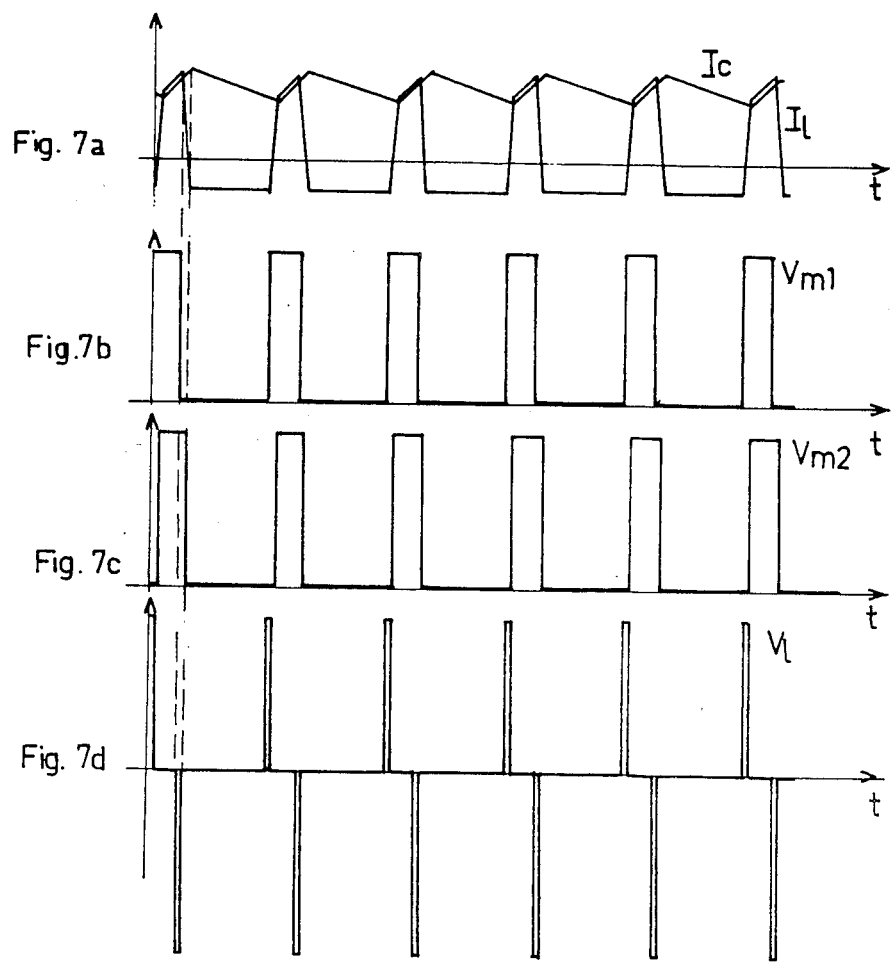

STATIC SEMI-CONDUCTOR ELECTRICAL ENERGY CONVERTER APPARATUS

DESCRIPTION

TECHNICAL FIELD

This invention relates to static semi-conductor electrical energy static converters which convert continuous electrical voltages into alternating voltages of predetermined frequency, and more particularly, to an electrical energy static converter of the type described in U.S. Pat. No. 4,330,819, the disclosure of which is herein incorporated by reference.

BACKGROUND ART

The '819 patent discloses a converter Γ (shown in FIG. 1) which eliminates energy losses during switching. The converter Γ uses semi-conductor power components having controlled blocking, which, in the '819 patent, are designated as "power transistors". A more suitable term for these components, which is used hereinafter, is "controlled blocking static interrupters". This designation encompasses all components which meet the following description: (1) a static electronic component having a control electrode (base, trigger grid . . .) which hereinafter will be designated as "base" (in order to simplify the terminology and by reference to the designation used in the transistors); (2) a power electrode (emitter, source, cathode . . . ), hereinafter designated as "emitter"; and (3) a second power electrode (collector, drain, anode . . . ), hereinafter designated as "collector". Such a static electronic component has two states: a forwardly biased conduction state characterized by a low voltage drop between the collector and the emitter ($V_{CE}$), and a reverse biased blocked state characterized by a low leakage current between emitter and collector. The change of state is under the control of the base electrode, which forwardly or reversely biases the component in accordance with the polarity of signal applied to the component.

Power transistors (bipolar or MOS) meet these criteria, but thyristors or other components also meet these criteria. To increase the voltage range in which the apparatus is utilized (without reducing current performance), transistors having a voltage $V_{CEX}$ greater than that of the voltage $V_{CEO}$, are advantageous as is indicated in the above-mentioned '819 patent. The voltage $V_{CEX}$ is defined as the voltage of the transistor at no collector current when the base is reverse biased, while the voltage $V_{CEO}$ is defined as the collector emitter voltage with the base open.

The converter Γ used with the present invention is shown in detail in FIG. 1 of the '819 patent. It comprises at least one power stage provided with two controlled blocking static interrupters, each having a collector, a base, and an emitter, and with a commutation circuit for shunting collector current from each static interrupter during blocking commutations thereof. The two static interrupters are arranged in a half-bridge rectifier configuration across the power supply terminals (+E, −E).

A control stage is provided for each static interrupter for generating a control signal of appropriate form for the conversion to be performed. Finally, a single processing stage is provided for each static interrupter. Each stage has one input connected to receive the control signal, another input connected to the power stage to detect the collector-emitter voltage $V_{CE}$ of the static interrupter, and an output connected to the base of the static interrupter to trigger the commutations thereof.

One of the signal processing stages will forwardly bias the base of the interrupter when the control signal has a value corresponding to placing the interrupter into conduction, and the voltage $V_{CE}$ on the interrupter is approximately zero. The other signal processing stage will reverse bias the other interrupter in order to block conduction.

In FIG. 1 of the '819 patent, which is hereinafter termed a converter of the type described, power stage 5 is provided with two controlled blocking static interrupters 7, each of which is associated with signal processing stage 4. Control stage 1 delivers a control signal $S_c$ for each static interrupter, the control signal being in the form of a train of pulses that successively produce blocking and unblocking conditions for the static interrupter.

Diode 8 is associated with each static interrupter of the power stage for recuperation of energy and commutation assistance to rapidly reduce the collector current of the static interrupter at the onset of a blocking commutation. This commutation assistance circuit is formed of condenser 9, placed in parallel between the emitter and the collector of the interrupter 7.

According to an embodiment of the converter described in the '819 patent, each intermediate stage 4 may comprise two shaper circuits $M_V$ and $M_C$. Shaper circuit $M_V$ operates on voltage $V_{CE}$ and furnishes a signal in one of either two states, one when the voltage $V_{CE}$ is almost zero, and the other when this voltage is different from zero. Shaper circuit $M_C$ operates on the control signal $S_C$ and furnishes a signal in one of either two states, one which places the power transistor into conduction, the other which blocks the control signal. A logic gate connected to the outputs of the two circuits $M_C$ and $M_V$ performs the logic function and with respect to the signals issuing from the shaping circuits so as to furnish a logic commutation signal having two states. An adaptation circuit A is also provided. This circuit is connected to the AND logic gate and to the base of the power transistor for furnishing base current such that conduction of the interrupter is affected for the state ONE which corresponding to the conduction of the static interrupter. The adaptation circuit furnishes a feed current to the base as a function of the signal issuing from the AND logic gate.

An object of the present invention is to improve the above-described converter.

BRIEF DESCRIPTION OF THE INVENTION

In the present invention, activation of the static interrupter (as occurs in known converters) is not forced, but occurs by a natural activation in a spontaneous manner when the voltage $V_{CE}$ reaches zero. This characteristic eliminates energy losses during commutation.

Normally, to have such properties, the converter must drive an inductive type load, which effects commutation of the static interrupter. In the case of a capacitative load, the system can no longer commutate because the voltage $V_{CE}$ does not reach zero each cycle.

The essential objective of the present invention is to permit operation of the converter in all cases, regardless of the type of load. Thus, the converter will be compatible with much more diversified loads, (for example, loads of cos φ), and will operate various drivers (for example, loads fed by modulation of the size of the alternating or continuous impulses).

Another objective of the invention is to considerably increase the safety of operation of the converters Γ in case of overloading. According to the invention, a supplementary output stage is located between the load and between one or several converters of the type described. This supplementary stage generates signals of alternating current, changing signs for each commutation of the static interrupters, such alternating current changing directions according to the collector-emitter circuit in each static interrupter at the instant when it appears.

Such conversion apparatus permit any type of load to be driven regardless of its nature (capacitative, inductive, resistive), and to give any shape to the desired electric waveform compatible with the nature of this load. It is also possible to obtain a conversion apparatus filling the following functions: a section having a continuous current, delivering a continuous voltage of an adjustable amplitude; a voltage inverter, feeding an alternating current involving a phased shift load; or a voltage inverter delivering a voltage wave with modulation of the size of impulses.

In all of these applications, the supplementary stage furnishes commutation conditions that the load alone will be incapable of procuring for it. In effect, this stage imposes for the output of one or several converters Γ of the type described (at the level of common points of the static interrupter pairs), a current that changes direction at each voltage commutation in the appropriate direction to allow this commutation when the load current is not normally compatible with such commutation.

BRIEF DESCRIPTION OF THE DRAWINGS

The invention will be better understood by reading the description which follows and referring to the attached drawings, which are given by way of nonlimiting example and represent several embodiments;

FIG. 4 is a circuit diagram of a second embodiment of the invention;

FIGS. 5a, 5b, 5c, and 5d are waveforms at various locations in the circuit diagram of FIG. 4;

FIG. 6 is a circuit diagram of yet another embodiment of the invention; and

FIGS. 7a, 7b, 7c, and 7d are waveforms taken at various locations in the circuit of FIG. 6.

DETAILED DESCRIPTION OF THE DRAWINGS

Figure 1:
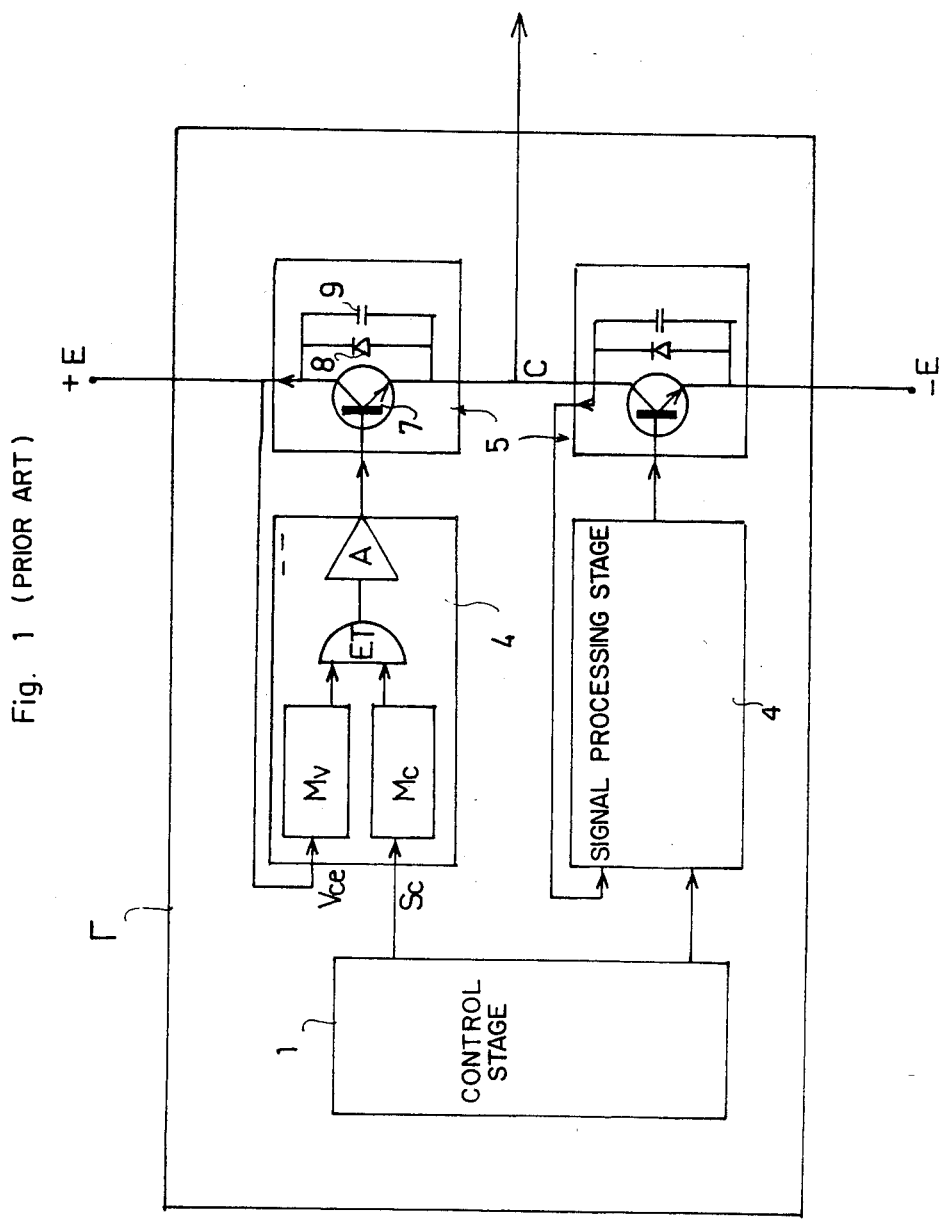
FIG. 1 illustrates a converter Γ of the type described as shown in the '819 patent.
Figure 2:
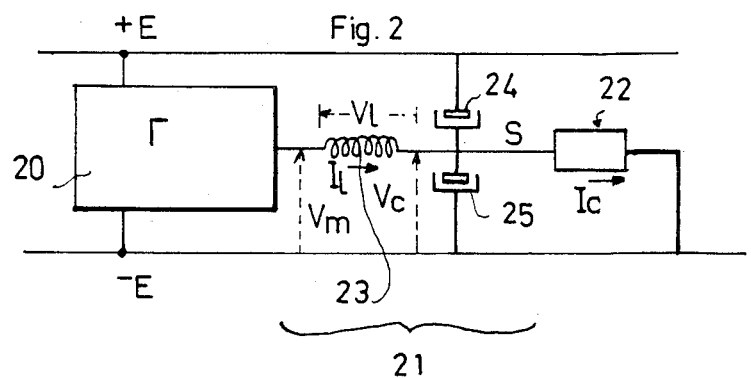
FIG. 2 is a circuit diagram of conversion apparatus according to a first embodiment.

The conversion apparatus shown by way of nonlimiting example in FIG. 2 comprises converter 20 (as described above and as shown in U.S. Pat. No. 4,330,819) and supplementary output stage 21, which supplies load 22. Stage 21 comprises inductance 23 having one and connected to the output the power stage of the converter Γ (at common point C of the static interrupter pairs which are, in the example of power transistors, mounted in half-bridge rectifier configuration) and another end constituting the output S of the apparatus connected to load 22. In addition, stage 21 includes two condensers 24 and 25, each connected between output S of the apparatus and the terminals +E and −E of the power supply of the converter Γ.

Condensers 24 and 25 may be connected to other voltage reference points taken with respect to the power supply. Moreover, it is possible to provide only a single condenser, namely in the case where power feeding can be considered as an ideal or perfect voltage source.

Stage 21 supplies an alternating current to the converter Γ output. The inductance and the condensers have values selected such that the current alternates, changing in sign for each successive commutation of the converter Γ. To achieve this effect, inductance 23 has an impedance of a low value, at the frequency of commutations of the converter Γ, adapted to provoke the sign changes of the alternating current. Condensers 24 and 25 have a high value of capacitance such that their impedance at the frequency of the converter Γ commutations is negligible with respect to the impedance of the load.

Figure 3A:
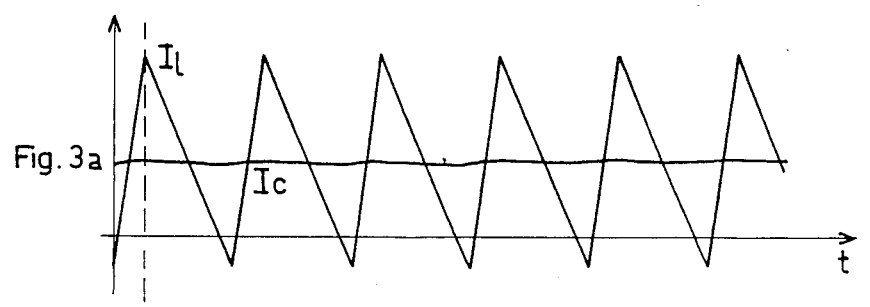
FIGS. 3a, 3b, and 3c are wave shapes at various locations of the circuit of FIG. 2.

FIG. 3a illustrates the current waveforms at different locations in the circuit of FIG. 2. The current $I_C$ is the current passing through load 22, and the current $I_L$ is the current passing through inductance 23.

Figure 3B:
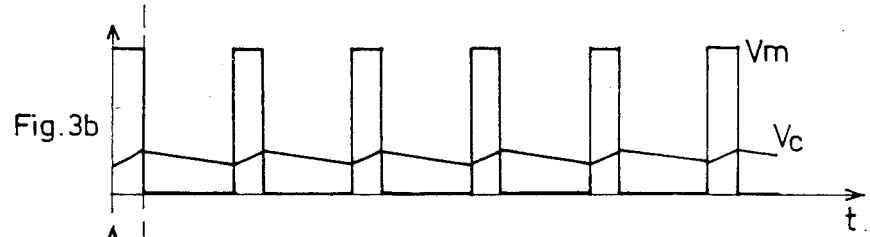

FIG. 3b illustrates the voltage at various points in FIG. 2. Voltage $V_M$ is the voltage at the output of the converter Γ and the voltage $V_C$ is the voltage at the output S of the conversion apparatus.

Figure 3C:
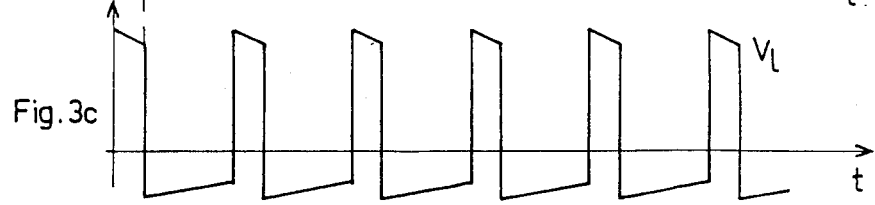

FIG. 3c represents the voltage across conductor 23. This last-mentioned voltage is an alternating voltage having a mean value of zero. The voltage arises due to the alternating current $I_L$ in inductance 23, the voltage changing in sign at each commutation of the converter Γ, the mean value being the value of a low current $I_C$.

The operation of the converter Γ is independent of the nature of the load and the precise form of the current passing through the load. In effect, all loads seen by the converter Γ across supplementary stage 21 become compatible with the converter Γ and with the commutation conditions of the converter Γ.

The converter Γ is automatically protected against excessive load current. In effect, in the case of an exaggerated increase in the load current $I_C$, the current $I_L$ (of which current $I_C$ is the mean value) does not have any change in sign, and the operation of the converter Γ is blocked, which ensures protection of its components.

The above-described converter apparatus can be utilized as a one-direction or two-direction circuit. This apparatus can be associated by a bridge with respect to the load, with one or several analog apparatus to comprise a conversion assembly capable of fulfilling the function of a low-frequency inverter. Moreover, as shown in FIG. 4, which represents a second embodiment of the invention, two identical supplementary circuits 26 and 27 are shown mounted in a monophase bridge configuration with respect to a load 28.

Each supplementary circuit 26, 27 comprises converter Γ 29 and supplementary output stage 30. The latter comprises inductance 31 and two condensors 32, 33 located as previously mentioned. In addition, this stage comprises a first diode 34, having its anode connected to the output S' of the apparatus and its cathode connected to the positive terminal +E of the power supply. Second diode 35 has its anode connected to negative terminal −E of the power supply and its cathode connected to the output S' of the apparatus.

As previously described, the value of inductor 31 is sufficiently low to provoke changes in sign of alternating current. However, in this embodiment, the condensors can have a capacitance much lower than that previously described. Their function here essentially is to slow the commutations of the output voltage $V_C$ with respect to voltage commutations $V_M$ of the output of the converter $\Gamma$, recalling, in the previous embodiment, the function of the condensors were to completely equalize the output voltage.

FIG. 5a illustrates the variation in current $I_C$ passing through load 28 as it relates to the inductor current $I_L$ FIG. 5b shows the voltage $V_M$ at the output of the converter $\Gamma$. FIG. 5c shows the voltage at one end of the load S+; and FIG. 5d shows the variation voltage across inductor 31 of FIG. 4.

The observations made with respect to the first embodiment are applicable to this second embodiment. Because the capacitance of capacitors 32 and 33 have lower values, the response time of this embodiment of the invention is much shorter, such that it can function as a high frequency converter $\Gamma$, whether modulated or not. The conversion assembly in the bridge defined by supplementary circuits 26, 27 allow for a converter whose frequency can vary over a wide range.

Referring now to FIG. 6, which shows the third embodiment of the present invention, supplementary circuit 36 is shown. The apparatus comprises two converters $\Gamma$ 37, 38 connected as a bridge at the terminals of supplementary output stage 39 having a function analogous to that of the supplementary stages already described. In this embodiment, stage 39 comprises inductor 40 mounted in the diagonal of the bridge. An intermediate point in the inductor S" comprises an output of the apparatus which is connected to the load. The impedance of inductor 40 is low at the frequency of the converter apparatus, thereby provoking changes in sign of the alternating current. The role played in this embodiment similar to that of condensers 32 and 33 of the second embodiment of FIG. 4. However, converter $\Gamma$ 38 introduces commutation delays between voltages at the outputs of the two converters $\Gamma$, $V_{M1}$ and $V_{M2}$.

FIG. 7a illustrates the variation in load current $I_L$, as compared to variations in the load current $I_C$. FIGS. 7b and 7c illustrate the relationship between the voltages $V_{M1}$ and $V_{M2}$ at the outputs of the converters 37, 38. Finally, FIG. 7d illustrates the variation in voltage across the inductor 40 itself.

The above-described adaptability of introducing commutation delay between the two converters permits limiting the amplitude of the current passing through the power stages of the converters $\Gamma$. The same types of diversity in load and protection against excessive voltages made in connection with the first two embodiments are applicable to this embodiment also.

The applications are the same as are those for the previous embodiment, but the proportioning in current of the power conductors can be reduced significantly.

Although the invention has been described with reference to particular means and embodiments, it is to be noted that the invention is not limited to the particulars disclosed, but extends to all equivalents within the scope of the claims.

We claim:

1. Static semi-conductor electrical energy converter $\Gamma$ apparatus comprising:

(a) a power stage including a pair of controlled blocking static interrupters, each having a collector, base and emitter electrodes, and a commutation assistant circuit associated with each of the interrupters for speeding up commutation of the interrupters;

(b) a control stage for developing a control signal $S_C$;

(c) a signal processing stage associated with each interrupter having two inputs, the signal $S_C$ being applied to one input, and the collector-emitter voltage $C_{CE}$ of the interrupter being applied to the other input, the output of the signal processing stage being connected to the power stage to trigger commutation thereof, the signal processing stage being adapted to drive the bases of the interrupters in a fashion to render them conductive in the single case where, simultaneously, the control signal $S_C$ has a value corresponding to an initiation of conduction of the interrupter, and the voltage $V_{CE}$ of the interrupter is approaching zero; and (d) a supplementary output stage for generating an alternating current at the output of the power stage which changes direction at each commutation thereof, the direction of the alternating current changing according to the direction of circulation of current in the emitter-collector of each interrupter at the instant of commutation.

2. Conversion apparatus according to claim 1 wherein the supplementary output stage comprises:

(a) an inductance having one end connected to the output of the power stage between the static interrupters, and the other end connected to a load; and (b) at least one condenser connected between the output of the power stage and a voltage reference point.

3. Conversion apparatus according to claim 1 wherein the supplementary output stage comprises:

(a) an inductance having one end connected to the output of the power stage between the static interrupters, and the other end connected to a load; and (b) at least one condenser connected between the output of the power stage and a voltage of a power supply.

4. Conversion apparatus according to claim 2 wherein the inductance has an impedance at the frequency of the commutations of the converter $\Gamma$ apparatus, of a value adapted to provoke a change in direction of the alternating current.

5. Conversion apparatus according to claim 4 wherein the condenser has a capacitance such that its impedance, at the frequency of the commutations of the converter $\Gamma$, is negligible with respect to the impedance of the load.

6. Conversion apparatus according to claim 2 wherein the supplementary output stage comprises:

(a) a first diode having an anode connected to one end of the inductance and a cathode connected to a reference voltage of positive polarity; and (b) a second diode having an anode connected to a reference voltage of negative polarity and a cathode connected to said one end of the inductance.

7. Static semi-conductor electrical energy converter $\Gamma$ apparatus comprising:

(a) at least two converters $\Gamma$, each comprising at least one power stage including a pair of controlled blocking static interrupters configured as a half-wave rectifier, each having a collector, base and emitter electrodes, and a commutation assistant circuit associated with each of the interrupters for speeding up commutation of the interrupters;

(b) a control stage for developing a control signal $S_C$;

(c) a signal processing stage associated with each interrupter having two inputs, the signal $S_C$ being applied to one input, and the collector-emitter voltage $V_{CE}$ of the interrupter being applied to the other input, the output of the signal processing stage being connected to the power stage to trigger commutation thereof, the signal processing stage being adapted to drive the bases of the interrupters in a fashion to render them conductive in the single case where, simultaneously, the control signal $S_C$ has a value corresponding to an initiation of conduction of the interrupter, and the voltage $V_{CE}$ of the interrupter is approaching zero; and (d) a supplementary output stage for generating an alternating current at the output of the power stage which changes direction at each commutation thereof, the direction of the alternating current changing according to the direction of circulation of current in the emitter-collector of each interrupter at the instant of commutation.

8. Conversion apparatus according to claim 7 wherein the supplementary output stage comprises an inductance mounted as the diagonal of the bridge, and an intermediate portion of the impedance constitutes a terminal connected to a load.

9. Conversion apparatus according to claim 8 wherein the inductance of the impedance, at the frequency of the commutations of the converter $\Gamma$, as a low value adapted to provoke changes in direction of the alternating current.

* * * * *

UNITED STATES PATENT AND TRADEMARK OFFICE
CERTIFICATE OF CORRECTION

PATENT NO. : 4,550,365

DATED : October 29, 1985

INVENTOR(S) : Henri FOCH and Jacques ROUX

It is certified that error appears in the above-identified patent and that said Letters Patent is hereby corrected as shown below:

Column 2, line 63, the phrase "does not reach zero each cycle." should be in Roman letters, and not subscript Italic letters.

Column 3, line 61, change "and" to ---end---.

Column 5, line 10, at end of the line insert ---.---.

Column 6, line 7, change "$C_{CE}$" to ---$V_{CE}$---.

Signed and Sealed this

Twenty-second Day of April 1986

[SEAL]

Attest:

DONALD J. QUIGG

Attesting Officer

Commissioner of Patents and Trademarks